(12) United States Patent
Pon

(10) Patent No.: US 8,200,446 B2
(45) Date of Patent: Jun. 12, 2012

(54) WAVEFORM CORRELATION RESULT PROCESSING METHODS AND APPARATUSES

(75) Inventor: Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 12/333,645

(22) Filed: Dec. 12, 2008

(65) Prior Publication Data
US 2010/0153040 A1    Jun. 17, 2010

(51) Int. Cl.
*G01R 13/00* (2006.01)
(52) U.S. Cl. .......................................................... 702/66
(58) Field of Classification Search ...................... 702/66
See application file for complete search history.

(56) References Cited

U.S. PATENT DOCUMENTS

| 5,390,207 | A | | 2/1995 | Fenton et al. |
| 5,901,183 | A | | 5/1999 | Garin et al. |
| 5,923,703 | A | | 7/1999 | Pon et al. |
| 5,949,815 | A | * | 9/1999 | Pon ................................ 375/150 |
| 5,966,403 | A | | 10/1999 | Pon |
| 6,130,908 | A | * | 10/2000 | Pon ................................ 375/227 |
| 6,633,255 | B2 | * | 10/2003 | Krasner .................... 342/357.63 |
| 7,002,516 | B2 | | 2/2006 | Gronemeyer |
| 7,206,336 | B1 | * | 4/2007 | Rog et al. ...................... 375/150 |

OTHER PUBLICATIONS

International Search Report and Written Opinion—PCT/US2009/067738—International Search Authority, EPO—Apr. 28, 2010.

* cited by examiner

*Primary Examiner* — Aditya Bhat
(74) *Attorney, Agent, or Firm* — Jimmy Cheng; Arnold J. Gum (57) ABSTRACT

Methods and apparatus are provided for use in devices adapted to perform waveform correlation result processing. An exemplary method may include accessing a plurality of collected measurement values stored in memory, establishing at least one combined measurement value based, at least in part, on at least two of the collected measurement values, and identifying at least one wireless signal within a reference waveform based, at least in part, on at least the combined measurement value. The method may also include establishing the at least one correlation result for at least one of the plurality of waveforms by correlating the at least one of the plurality of waveforms with the reference waveform.

37 Claims, 4 Drawing Sheets

WAVEFORM CORRELATION RESULT PROCESSING METHODS AND APPARATUSES

BACKGROUND

1. Field

The subject matter disclosed herein relates to electronic devices, and more particularly to methods and apparatuses for use in electronic devices adapted to perform waveform correlation result processing.

2. Information

Wireless communication systems and devices are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to be adapted to communicate with more than one wireless communication system and this trend appears to be growing.

Another popular and increasingly important wireless technology includes navigation systems and devices and in particular satellite positioning systems (SPS) such as, for example, the global positioning system (GPS) and other like Global Navigation Satellite Systems (GNSS). An SPS receiver path, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path.

These exemplary wireless devices and/or other similar electronic devices may be adapted to perform waveform correlation other like processes that allow for a specific wireless signal to be identified within a reference waveform which may include noise and other signals. In certain situations, a specific wireless signal may arrive at a receiving wireless device via different paths. For example, a reference waveform may include a wireless signal that traveled directly from an antenna of a transmitting device to an antenna of the receiving device along a direct path, and one or more multipath versions of the wireless signal which may have traveled along different reflected paths. It may be beneficial to adapt a wireless device to remove, ignore, reduce, or otherwise discriminate in some manner such multipath signals and/or identify a signal without or with less significant multipath components/effects.

SUMMARY

Methods and apparatus are provided for use in devices adapted to perform waveform correlation result processing.

In accordance with one exemplary aspect, a method may be provided that includes accessing a plurality of collected measurement values stored in memory, wherein each of the collected measurement values may be associated with at least one correlation result for a different waveform that may be selected from a corresponding plurality of waveforms. The method may include establishing at least one combined measurement value based, at least in part, on at least two of the collected measurement values, and identifying at least one wireless signal within a reference waveform based, at least in part, on at least the combined measurement value.

In certain example implementations, the method may include establishing the at least one correlation result for at least one of the plurality of waveforms by correlating the at least one of the plurality of waveforms with the reference waveform.

In certain example implementations, the method may include establishing at least one of the plurality of collected measurement values based, at least in part, on one or more correlation results associated with at least one of the plurality of waveforms. For example, by summing the correlation results to establish an intermediate summation value, and squaring the intermediate summation value to establish a collected measurement value. For example, by adding or subtracting at least a portion at least a first collected measurement value to or from at least a portion of a second collected measurement value. For example, by establishing an intermediate product value by multiplying the at least two of the plurality of collected measurement values, establishing an intermediate square root value by taking a square root of the intermediate product value, and at least one of: adding or subtracting at least a portion of the intermediate square root value to or from at least a portion of at least one collected measurement value; and/or, adding or subtracting at least a portion of the intermediate square root value to or from at least a portion of at least one other intermediate square root value.

In certain example implementations, the method may include performing a tracking operation based, at least in part, on the combined measurement value. For example, by initiating an establishment of at least one other combined measurement value based, at least in part, on at least a subset of the plurality of collected measurement values, and performing a subsequent tracking operation based, at least in part, on the at least one other combined measurement value.

In certain example implementations, the method may include receiving the reference waveform, and generating at least a portion of the plurality of waveforms based, at least in part, on a local code waveform. In certain example implementations, the plurality of waveforms may comprise at least one of a local code waveform, a replica waveform, and/or a combined waveform, and/or the wireless signal(s) may comprise a satellite positioning system (SPS) signal.

In accordance with another exemplary aspect, an apparatus may be provided that may include memory adapted to store a plurality of collected measurement values, wherein each of the collected measurement values may be associated with at least one correlation result for a different waveform selected from a corresponding plurality of waveforms. The apparatus may include at least one processing unit that may be operatively coupled to the memory. The processing unit may be adapted to establish at least one combined measurement value based, at least in part, on at least two of the plurality of collected measurement values, and identify at least one wireless signal within a reference waveform based, at least in part, on at least the combined measurement value.

In certain example implementations, the apparatus may include correlation circuitry that may be operatively coupled to the memory and/or processing unit and adapted to establish the at least one correlation result for at least one of the plurality of waveforms by correlating the at least one of the plurality of waveforms with the reference waveform.

In certain example implementations, the apparatus may include receiver circuitry that may be opertively coupled to the memory and/or processing unit and adapted to receive the reference waveform.

In accordance with yet another exemplary aspect, an apparatus may be provided that may include means for establishing a plurality of collected measurement values, each of the plurality of collected measurement values being associated with at least one correlation result for a different waveform selected from a corresponding plurality of waveforms, means for establishing at least one combined measurement value based, at least in part, on at least two of the plurality of collected measurement values, and means identifying at least one wireless signal within a reference waveform based, at least in part, on at least the combined measurement value.

In accordance with still another exemplary aspect, a computer readable medium comprising computer implementable instructions stored thereon may be provided, wherein the computer implementable instructions, if implanted by at least one processing unit adapt the at least one processing unit to access a plurality of collected measurement values, establish at least one combined measurement value based, at least in part, on at least two of the plurality of collected measurement values, and identify at least one wireless signal within a reference waveform based, at least in part, on at least the combined measurement value.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Overview

Methods and apparatus are provided for use in devices adapted to perform waveform correlation result processing. Such methods and apparatuses may, for example, be implemented in wireless navigation and/or communication devices that are adapted to receive wireless signals within a received reference waveform and to correlate the reference waveform with locally generated waveforms.

Such methods and apparatuses may, for example, be adapted to provide post correlation processing based on correlation results. For example, certain implemented post correlation processing techniques may be adapted to selectively combine collected measurement values associated with correlation results in accordance with an arithmetic formula to establish a combined measurement value. A combined measurement value may, for example, be useful in identifying a wireless signal and/or excluding undesired wireless signals, such as, certain multipath signals.

In certain example implementations, the arithmetic formula(s) that may be used to establish such combined measurement value(s), may be adapted to match, simulate, emulate and/or otherwise approximate in some manner, certain correlation results that may have been produced had the reference waveform been correlated with a combined waveform based on two or more of the locally generated waveforms. One of the advantages of such methods and apparatuses is that there may be no need for actual combined waveform(s) to be generated. Instead, post correlation processing techniques may be adapted to provide for the same and/or similar capabilities/results. Further still, such post processing techniques may, for example, be adapted to permit quick and/or easy changes to the formula(s).

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The functions described may be implemented in hardware, software, firmware, or any combination thereof. If implemented in software or firmware, the functions may be stored on a physical computer-readable medium as one or more instructions or code. Computer-readable media includes physical computer storage media. A storage medium may be any available physical medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Computer instructions/code may be transmitted via signals over physical transmission media from a transmitter to a receiver. For example, the software or firmware may be transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

The methods and apparatuses may be adapted to any electronic device. Examples of such devices herein include navigation and/or communication devices. However, claimed subject matter is not intended to be limited to just these examples.

With regard to certain exemplary navigation devices, a satellite positioning system (SPS) may include a system of transmitters positioned to enable entities to determine their location on the Earth based, at least in part, on signals received from the transmitters. Such a transmitter may transmit a signal marked with a repeating pseudo-random noise (PN) code of a set number of chips and may be located on ground based control stations, user equipment and/or space vehicles. A "space vehicle" (SV) as referred to herein relates to an object that is capable of transmitting signals to receivers on or above the Earth's surface. In one particular example, such an SV may include a geostationary satellite. Alternatively, an SV may include a satellite traveling in an orbit and moving relative to a stationary position on the Earth. However, these are merely examples of SVs and claimed subject matter is not limited in these respects.

In a particular example, such transmitters may be located on SVs such as Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation device may be adapted to determine pseudorange measurements to SVs "in view" of the receiver using well known techniques based, at least in part, on detections of PN codes in signals received from the SVs. Such a pseudorange to an SV may be determined based, at least in part, on a code phase detected in a received signal marked with a PN code associated with the SV during a process of acquiring the received signal at a receiver. To acquire the received signal, a navigation device may be adapted to correlate a reference waveform (e.g., received signal) with a generated waveform (e.g., locally generated PN code) associated with an SV. For example, such a navigation device may correlate such a received signal with multiple code and/or phase/time shifted versions (replica signals) of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS SV, a receiver may form multiple pseudorange hypotheses. Using additional information, a receiver may eliminate such pseudorange hypotheses to, in effect, reduce an ambiguity associated with a true pseudorange measurement. With sufficient accuracy in knowledge of timing of a signal received from a GNSS SV, some or all false pseudorange hypotheses may be eliminated.

Once a signal has been acquired, a receiving device may enter into a tracking or other like mode or operation to continue to identify and/or monitor a specific wireless signal within a received reference waveform.

While the examples herein include navigation signals it should be understood that the methods and apparatuses and techniques provided herein are adaptable to other wireless signaling systems, such as, for example, wireless communication systems. Again, claimed subject matter is not intended to be limited to navigation systems.

Figure 1:
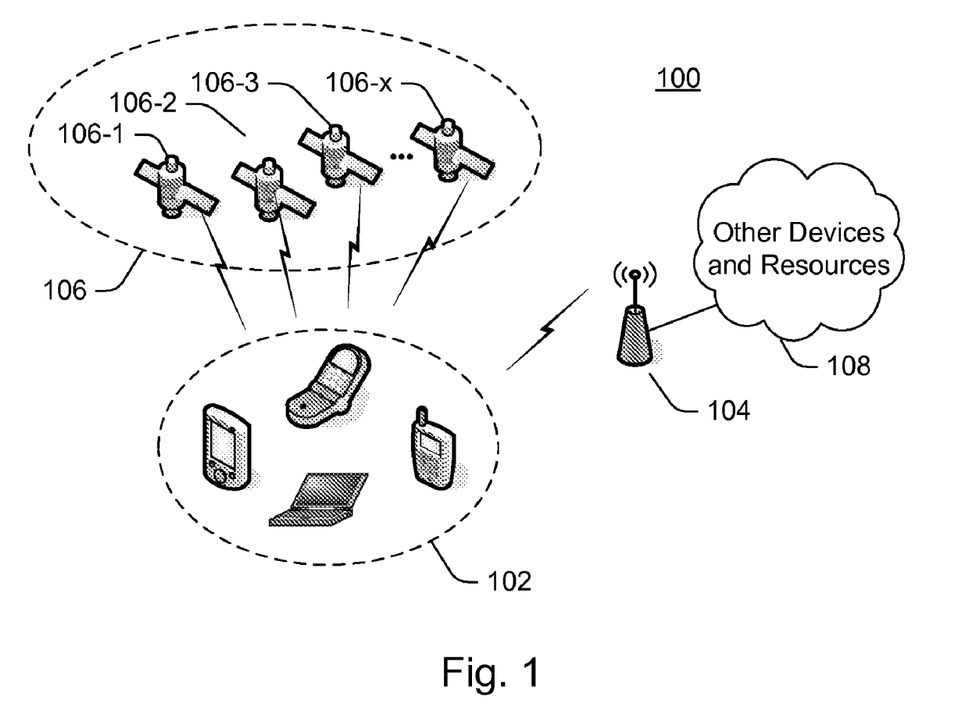
FIG. 1 is block diagram illustrating an exemplary wireless signaling environment that includes a device adapted to perform waveform correlation processing in accordance with an implementation.

With this in mind, FIG. 1 is a block diagram illustrating a wireless environment 100 that may include various computing and communication resources. This example implementation may be adapted to provide at least some form of navigation services in accordance with certain exemplary implementations of present description. This example implementation may also and/or alternatively be adapted to provide at least some form of communication services in accordance with certain exemplary implementations of present description.

As for navigation services, for example, as shown in FIG. 1 an SPS 106 may include a plurality of SVs 106-1, 106-2, 106-3, . . . , 106-x that may transmit SPS signals to a device 102.

By way of example but not limitation, as illustrated using icons in FIG. 1, device 102 may include a mobile device such as a cellular phone, a smart phone, a personal digital assistant, a portable computing device, a navigation unit, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively adapted for use in another device.

In certain implementations wireless environment 100 may further include and/or alternatively include various computing and communication resources adapted to provide communication and/or other information processing services with respect to device 102. Thus, for example, wireless environment 100 may be representative of any system(s) or a portion thereof that may include at least one device 102 adapted to transmit and/or receive wireless signals to/from at least one wireless communication system 104.

As illustrated in FIG. 1, wireless communication system 104 may be adapted to communicate with and/or otherwise operatively access other devices and/or resources as represented simply by cloud 108. For example, cloud 108 may include one or more communication devices, systems, networks, or services, and/or one or more computing devices, systems, networks, or services, and/or the like or any combination thereof.

Device 102 may, for example, be adapted for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Device 102 may receive transmissions from SVs 106-1, 106-2, 106-3, . . . , 106-x in the line of sight (LOS) to device 102, and derive time measurements from four or more of the transmissions.

Techniques described herein may be used with any one of several SPS' and/or combinations of SPS'. Furthermore, such techniques may be used with positioning determination systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time. Such a transmitter may be assigned a unique PN code so as to permit identification by a remote receiver. Pseudolites may be useful in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to provide waveform correlation result processing.

Figure 2:
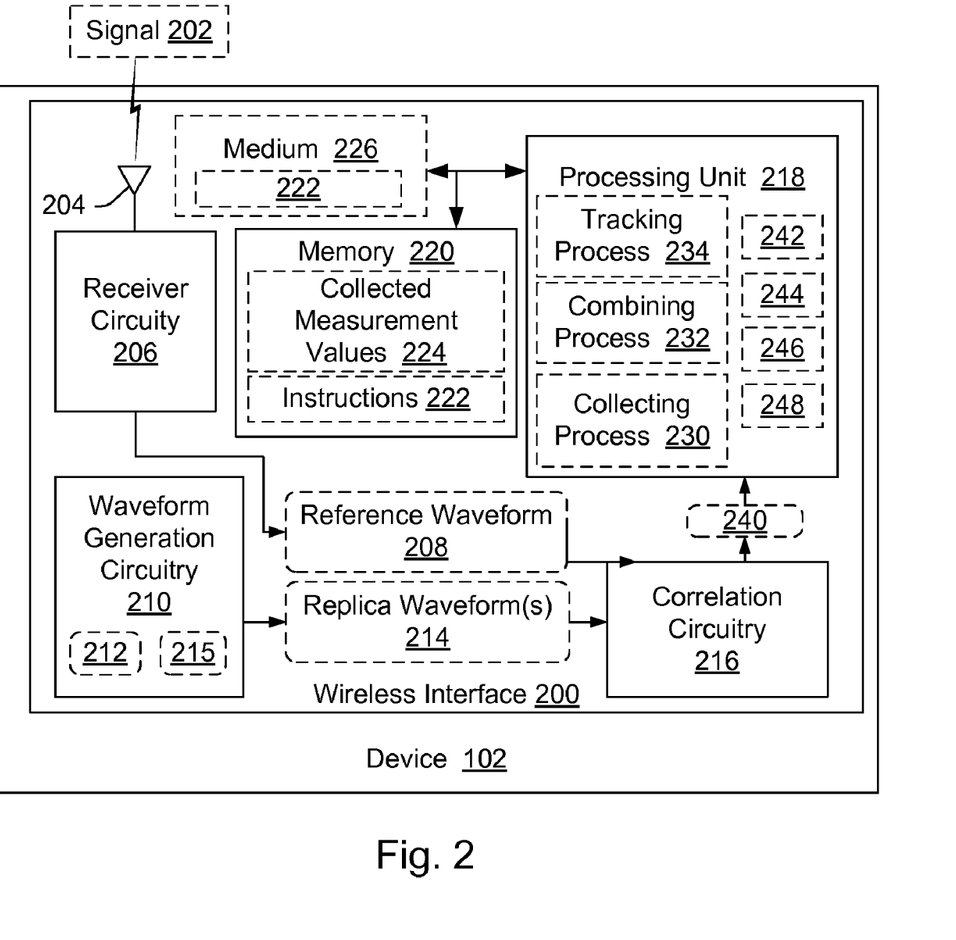
FIG. 2 is block diagram illustrating certain features of an exemplary device having at least one wireless interface adapted to perform waveform correlation processing that may, for example, be implemented in the environment of FIG. 1.

As illustrated in the exemplary block diagram of FIG. 2, in certain example implementations, device 102 may include a wireless interface 200 adapted to receive a wireless signal 202. Wireless interface 200 may, for example, be adapted for use with navigation signals, communication signals, and/or other like wireless signals.

As shown in the example implementation, wireless interface 200 may include at least one antenna 204 and operatively coupled receiver circuitry 206, which may be adapted to receive wireless signal 202 and possibly other signals, noise, etc., and establish a corresponding reference waveform 208. Wireless interface 200 may also include, for example, waveform generation circuitry 210 adapted to establish at least one local code waveform 212 and a plurality of replica waveforms 214, which may be used for waveform correlation.

Wireless interface 200 may include, for example, correlation circuitry 216 that may be adapted to correlate at least reference waveform 208 with a plurality of waveforms 212/214 to establish a corresponding plurality of correlation results 240.

Various different types of correlation circuits are well known and which may be implemented within correlation circuitry 216. Correlation circuitry 216 may be implemented in hardware, software, or a combination of hardware and software. By way of example but not limitation, correlation circuitry 216 may, for example, include one or more correlators, implement a discrete Fourier transform (DFT) function, and/or the like. In certain implementations, correlation circuitry 216 may include one or more processing units and specific instructions, and/or the like.

Wireless interface 200 may include, for example, one or more processing units 218 adapted to perform waveform correlation result processes in accordance with the present description. As shown, processing unit 218 may be operatively coupled to memory 220. Memory 220 may be adapted to store data and/or instructions. For example, as shown in the example implementation of FIG. 2, instructions 222 and/or collected measurement values 224 may be stored in memory 220.

As illustrated in FIG. 2 a computer readable medium 226 may be provided and accessed by processing unit 218, for example. As such, in certain example implementations, the methods and/or apparatuses may take the form in whole or part of a computer readable medium 226 that may include computer implementable instructions 222 stored thereon, which if executed by at least one processing unit or other like circuitry are adapted to enable the processing unit(s) 218 or the other like circuitry to perform all or portions of the waveform correlation result processes presented herein. In certain implementations, reference waveform 208, local code waveform 212, and/or one or more replica waveforms 214 may be digitized and stored in memory 220 and accessed by correlation circuitry 216.

Processing unit 218 may be implemented in hardware, software, or a combination of hardware and software. Processing unit 218 may be representative of one or more circuits configurable to perform at least a portion of a data computing procedure or process. By way of example but not limitation, processing unit 218 may include one or more processors, controllers, microprocessors, microcontrollers, application specific integrated circuits, digital signal processors, programmable logic devices, field programmable gate arrays, and the like, or any combination thereof.

As shown in FIG. 2, processing unit 218 may be adapted to provide, in whole or part, one or more processes associated with the waveform correlation result processing provided herein. By way of example but not limitation, processing unit 218 may be adapted to provide or otherwise support a collecting process 230, a combining process 232, and/or a tacking process 234. In certain example implementations, processing unit may also establish one or more combined measurement values 242, intermediate summation values 244, intermediate product values 246, and/or intermediate square root values 248, which may be associated with certain exemplary waveform correlation result processes. These processes and corresponding values (data) are described in greater detail in subsequent sections. While illustrated within processing unit 218, it should be recognized that one or more of these values and/or other data, may be stored in memory 220.

Memory 220 may be representative of any data storage mechanism. Memory 220 may include, for example, a primary memory and/or a secondary memory. Primary memory may include, for example, a random access memory, read only memory, etc. While illustrated in this example as being separate from processing unit 218, it should be understood that all or part of a primary memory may be provided within or otherwise co-located/coupled with processing unit 218. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 226. Here, for example, computer readable medium 226 may include any media that can carry data and/or instructions.

As further illustrated in FIG. 3 and described below, certain known techniques provide for the correlation of a local code waveform and replica waveforms thereof with a reference waveform. Further, it is known that there may be benefits to combining two or more of the local code waveform and/or replica waveforms together to form a combined waveform which may then be correlated with the reference waveform. One potential benefit to correlating a reference waveform with a combined waveform is that the shape of the combined waveform may be selected such that it excludes certain multipath components within the reference waveform. However, as described, such techniques inherently require that such a combined waveform be established prior to correlation, which may require additional resources and/or introduce delays when a change from one combined waveform to another combined waveform is made.

To the contrary, certain exemplary methods and apparatuses are presented herein in which post correlation result processing techniques may be implemented to match, simulate, emulate or otherwise approximate in some manner the results of correlating the reference waveform with one or more combined waveforms. Thus, for example, the post correlation processing techniques may be adapted to provide benefits previously realized by correlating the reference waveform with a combined waveform, but without necessarily requiring that such combined waveform be established prior to correlation. Thus, in certain implementations, such post correlation processing techniques may establish combined waveform like correlation results based on the correlation results associated with a plurality of waveforms such as the local code waveform and/or replica waveforms. Thus, in certain implementations there may not be a need for additional resources to establish combined waveforms. In certain implementations, one or more combined waveform like correlation results (combined measurement values) may be established simultaneously, and/or the combining formula(s) easily changed without introducing significant delays.

Figure 3:
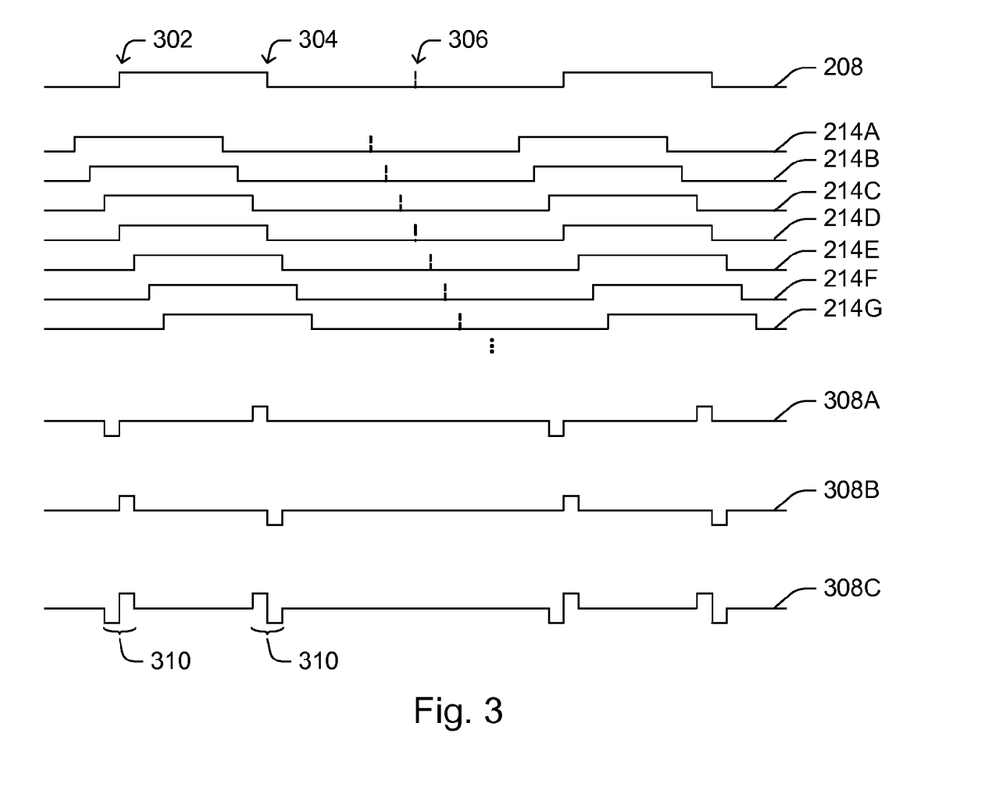
FIG. 3 is an illustrative set of graphed waveforms presenting certain aspects of an exemplary conventional waveform correlation process.

With at least these differences in mind, reference is now made to FIG. 3, which is an illustrative set of graphed waveforms illustrating certain aspects of an exemplary known waveform correlation process that may be at least approximated using certain exemplary waveform correlation result processes as provided herein.

The graphed waveforms in FIG. 3 illustrate certain exemplary waveforms, including a portion of a reference waveform 208, and several replica waveforms 214A through 214G, and several combined waveforms 308A through 308C. Here, reference waveform 208 may include or otherwise be associated with wireless signal 202, and replica waveforms 214A through 214G may be associated with local code waveform 212. For example, replica waveforms 214A through 214G may be phase shifted versions of local code waveform 212. Here, combined waveforms 308A through 308C may be associated with a selected plurality of replica waveforms 214A through 214G and/or local code waveform 212.

In a conventional device, such combined waveforms 308A through 308C may, for example, be established prior to correlation based, at least in part, on linear combinations of two or more of the replica waveforms 214A through 214G and/or local waveform 212. Instead of correlating a reference waveform with a phase shifted replica waveform such as 214A it is known that it may be more useful to correlate a reference waveform 208 with a combined waveform such as 308C. For example, reference waveform 208 may include transition points 302, 304 and 306. Here, for example, at transition point 302 reference waveform 208 may increase from zero to a high value (e.g., "1"), at subsequent transition point 304 reference waveform 208 may return to zero, and at even further subsequent transition point 306 reference waveform 208 may remain at zero. As illustrated, replica waveform 214D appears to most closely match reference waveform 208. However, in a potential multipath signaling environment, it may be beneficial to in addition, or instead to correlate reference waveform 208 with a combined waveform such as combined waveform 308C which provides narrowed transition regions 310 that may exclude certain multipath signals. Here, for example, narrowed transition regions 310 appear to align well with the transition points 302 and 304 wherein the reference waveform makes a transition between zero and "1". Also, combined waveform 308C transitions from a negative value (e.g., "−1") to a high value (e.g., "1") during the narrowed transition regions 310, which may further improve correlation results.

In the example shown in FIG. 3, combined waveform 308A represents a combination of waveforms 214C (C) and 214D (D) based on $$\frac{(D-C)}{2},$$

combined waveform 308B represents a combination of waveforms 214D (D) and 214E (E) based on $$\frac{(D-E)}{2},$$

and combined waveform 308C represents a summation of 308A and 308B which therefore provides $$D - \frac{(C+E)}{2}.$$

It should be recognized that this is just one example of a combined waveform formula.

Thus, as illustrated in the above example, combined waveforms may be generated prior to correlation as part of a known waveform correlation process. For further reference, the reader is directed to U.S. Pat. No. 5,901,183, issued to Garin et al. on May 4, 1999, and U.S. Pat. No. 5,966,403 issued to Pon on Oct. 12, 1999.

Figure 4:
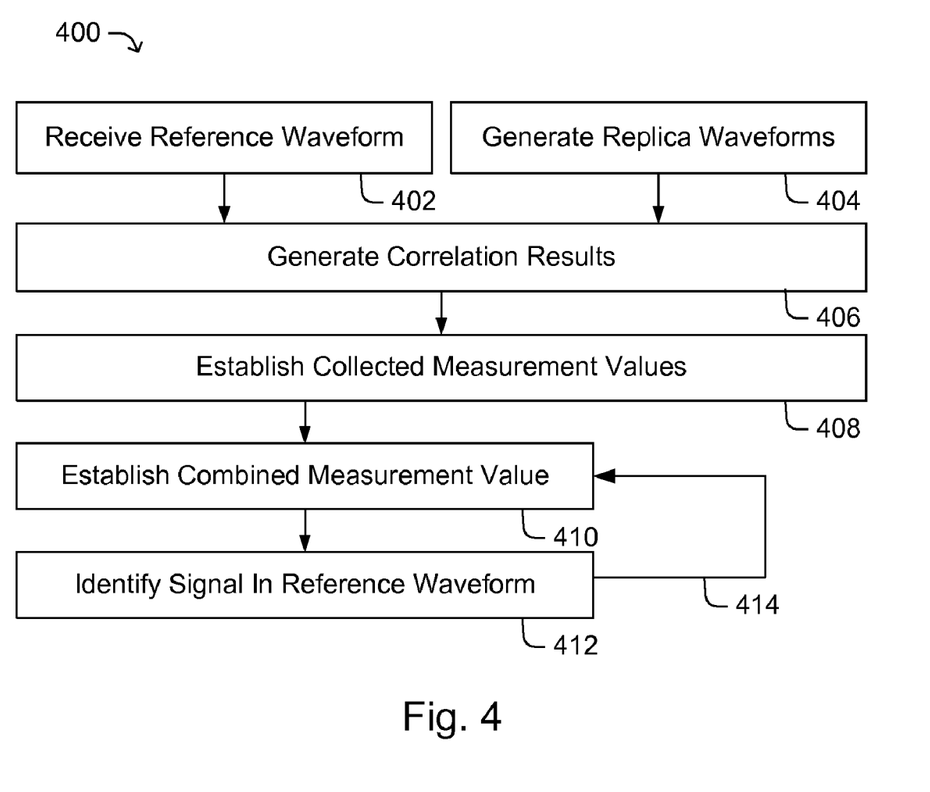
FIG. 4 is a flow diagram illustrating an exemplary method adapted to perform waveform correlation processing that may, for example, be implemented in the environment of FIG. 1 and/or the device of FIG. 2.

Reference is now made to FIG. 4, which is a flow diagram illustrating an exemplary method 400 that may be adapted to perform post correlation result processing in accordance with an aspect of the present description. At block 402, a reference waveform is received and/or otherwise accessed. At block 404, a local code waveform and/or replica waveforms may be generated or otherwise provided. In certain implementations, combined waveforms or the like may also be generated or otherwise provided at block 404. At block 406, correlation results may be generated or otherwise established. Each correlation result may be associated with a correlation of the reference waveform with one of the waveforms generated at block 404.

At block 408, collected measurement values may be established. Each collected measurement value may be based, at least in part, on one or more correlation results associated with a correlation of the reference waveform with one of the waveforms generated at block 404. In certain exemplary implementations, as described in greater detail below, a collected measurement value may include a uniform correlation energy sum.

At block 410, at least one combined measurement value may be established. Such combined measurement value may, for example, be based, at least in part, on two or more collected measurement values from block 408. Such combined measurement value may, for example, be determined based on an arithmetic formula and/or other like function. In certain exemplary implementations, as described in greater detail below, a combined measurement value may include an equivalent of a non-uniform correlation energy sum.

At block 412, at least one signal in the reference waveform may be identified. For example, at least one wireless signal and/or an aspect or parameter relating thereto within the reference waveform may be identified based, at least in part, on at least one combined measurement value. In certain implementations, block 412 may be associated with a tracking operation or process and/or other like search operation or process.

In certain exemplary implementations, as illustrated by process arrow 414 method 400 may include an iterative and/or other like feedback capability between blocks 412 an 410. For example, at block 412 it may be determined that a different and/or a specific formula should be used to establish a different combined measurement value at block 410. Thus, at block 412, such a determination may be indicated and/or otherwise communicated to block 410.

Thus, in accordance with an exemplary implementation of method 400 and exemplary wireless interface 200 of FIG. 2, processing unit 218 may be adapted to implement collecting process 230 at block 408, which may establish a plurality of collected measurement values 224 that may be stored in memory 220. Collecting process 230 may establish collected measurement values 224 based, at least in part, on correlation results 240. Thus, each of the plurality of collected measurement values 224 may be associated with at least one correlation result for a different replica waveform 214. Processing unit 218 may be adapted to implement combining process 232 at block 410, which may establish at least one combined measurement value 242 based, at least in part, on at least two collected measurement values 224. Processing unit 218 may be adapted to implement tracking process 234 at block 412, which may identify at least one wireless signal 202 within reference waveform 208 based, at least in part, on at least one combined measurement value 242.

In certain example implementations, correlation circuitry 216 and/or processing unit 218 may be adapted in accord with block 406 to establish at least one correlation result 240 by correlating a local code waveform 212, a replica waveform 214, and/or a combined waveform 215, with a reference waveform 208.

In certain example implementations, collecting process 230 may be adapted to arithmetically establish at least one collected measurement value 224 based, at least in part, on one or more correlation results 240 associated with at least one of local code waveform 212, replica waveform 214, and/or combined waveform 215. By way of example but not limitation, collecting process 230 may arithmetically establish at least one collected measurement value 224 by summing correlation results 240 to establish an intermediate summation value 244, and squaring intermediate summation value 244 to establish a collected measurement value 224. By way of example but not limitation, collecting process 230 may arithmetically establish at least one collected measurement value 224 by adding or subtracting at least a portion at least a first collected measurement value 224 to or from at least a portion of a second collected measurement value 224. An example arithmetic formula is presented in subsequent sections, which may be adapted and implemented by collecting process 230.

In certain example implementations, combining process 232 may be adapted to establish an intermediate product value 246 by multiplying at least two collected measurement values 224, and establish an intermediate square root value 248 by taking a square root of intermediate product value 246. In certain example implementations, combining process 232 may be further adapted to add or subtract at least a portion of intermediate square root value 246 to or from at least a portion of at least one collected measurement value 224. In certain other example implementations, combining process 232 may be adapted to add or subtract at least a portion of intermediate square root value 248 to or from at least a portion of at least one other intermediate square root value 248. An example arithmetic formula is presented in subsequent sections, which may be adapted and implemented by combining process 232.

In certain example implementations, tracking process 234 may be adapted to perform a tracking operation based, at least in part, on at least one combined measurement value 224. By way of example but not limitation, tracking process 234 may be adapted to initiate that combining process 232 establish at least one other combined measurement value 224, for example, as part of an iterative process per process arrow 414.

By way of example but not limitation, some exemplary techniques that may be implemented in device 102 will now be described in greater detail. To do so, reference is made once again to the exemplary waveforms in FIG. 3.

In FIG. 3, in an exemplary implementation, replica waveforms 214A through 214G may represent uniform correlation data and combined waveforms 308A through 308C may represent non-uniform correlation data based, at least in part, on linear combinations of two or more of the replica waveforms 214A through 214G and/or local code waveform 212. In this example, it may be assumed that the uniform correlation data samples may be identical between all uniform correlators, for a duration of a coherent summation. Here, for example, each of such uniform correlation data samples may be phase shifted from local code waveform 212.

As illustrated in FIG. 3 and previously described, one may effectively obtain one or more non-uniform combined waveforms 308A through 308C, from selected linear combinations of replica waveforms 214A through 214G which have been delayed (e.g., phase shifted). Such a correlation process may be linear, so the correlation result 240 applies for a full coherent integration period summation.

With the exemplary post correlation processing techniques presented herein, the collected measurement values (e.g., uniform correlation coherent energy sums) may be processed to establish a combined measurement value that may be at least substantially similar to a case wherein a reference waveform is correlated with a combined waveform that was instead generated prior to correlation and then used in the correlation process.

Several benefits to such post correlation result processing may be realized. For example, in certain implementations additional hardware may not be needed to generate the unique combined waveforms needed for such non-uniform correlation. For example, in certain implementations additional flexibility may be provided by allowing different combining process formulas to be easily and quickly implemented. By way of example but not limitation, a formula may be selected and implemented which changes an effective width of a non-uniform correlation result, by selectively combining different collected measurement values.

For instance, a narrow non-uniform correlation may be implemented resulting in a short auto correlation function (ACF) but with a large reduction in correlation signal energy based on a formula to emulate linear combination of combined waveform 308C, e.g., $$D - \frac{(C+E)}{2}.$$

Thus, to increase (e.g., double) the non-uniform correlation width, to incur less signal loss by 3 db at the expense of a wider ACF, a different formula may be implemented to emulate a different linear combination such as, e.g., $$\frac{(D-B)}{2} + \frac{(D-F)}{2}.$$

In certain implementations, no special hardware may be needed to implement such a change since the present techniques may be implemented after correlation based on the correlation results associated with the individual replica signals, for example.

In accordance with an exemplary implementation, therefore energy for one uniform correlation result (collected measurement value) may be expressed as:

$$\text{Energy} = \sum_{PostD} \left[ \left( \sum_{PreD} Z e^{j\theta} \right)^2 \right]$$

Assuming the frequency offset is at or near zero, the θ term may represent the phase offset between the incoming signal and the local carrier phase. The Z term may represent the amplitude of the input signal plus the correlation with the local code. For static or near static conditions, one may assume the phase θ term to be constant, independent of the pre-detection (PreD) samples, thus one may bring that term outside of the summation, as shown below:

$$\text{Energy} = \sum_{PostD} \left[ \left( e^{j\theta} \sum_{PreD} Z \right)^2 \right]$$

The squaring operation on the phase term may represent a multiply by the complex conjugate, which effectively removes the $e^{j\theta}$ term, so the phase information may be lost. Such may be implemented, for example, by performing the $I^2 + Q^2$ operation similar to $(e^{j\theta})(e^{-j\theta})$.

$$\text{Energy} = \sum_{PostD} \left[ \left( \sum_{PreD} Z \right)^2 \right]$$

With such result one may then effectively obtain the equivalent of the linear combinations prior to detections, and relate such to the energy sums after detection. Here, for example, a linear combination may be equivalent to a non-uniform correlation, from the example above with respect to combined waveform 308C (e.g., combination based on $$\left( e.g., \text{combination based on } D - \frac{(C+E)}{2} \right).$$

$$EnergyNU = \sum_{PostD} \left[ \left( e^{j\theta} \sum_{PreD} \left( D - \left( \frac{C+E}{2} \right) \right) \right)^2 \right]$$

$$EnergyNU = \sum_{PostD} \left[ \sum_{PreD} D \sum_{PreD} D + \frac{1}{4} \sum_{PreD} C \sum_{PreD} C + \right.$$

$$\left. \frac{1}{4} \sum_{PreD} E \sum_{PreD} E + \frac{1}{2} \sum_{PreD} C \sum_{PreD} E - \sum_{PreD} D \sum_{PreD} C - \sum_{PreD} D \sum_{PreD} E \right]$$

which then leads to an example arithmetic formula for a combined measurement value:

$$EnergyNU = $$
$$EnergyD + \frac{1}{4} EnergyC + \frac{1}{4} EnergyE + \frac{1}{2} \sqrt{EnergyC * EnergyE} - $$
$$\sqrt{EnergyD * EnergyC} - \sqrt{EnergyD * EnergyE}$$

In the example formula above and with respect to FIG. 2, EnergyNU represents a combined measurement value 242, EnergyD represents one example of an intermediate summation value 244, EnergyC*EnergyE represents one example of an intermediate product value 246, √EnergyD*EnergyC represents one example of an intermediate square root values 248.

In accordance with an aspect of the present description it is believed that such a resulting combined measurement value may provide at least a reasonable or otherwise useful approximation for correlation results that may be associated with combined waveform 308C. Thus, it is believed that post correlation processes may be adapted as such to use energy sums (e.g., collected measurement values 224) to establish a non-uniform correlation result equivalent (e.g., combined measurement value 242).

By way of example but not limitation, the exemplary post correlation result processing techniques provided herein may be adapted for use with a wireless signal 202 having a chip rate of 1.023 MHz. Correlation circuitry 216 may be adapted therefore to establish 15 sample correlation values for each chip (e.g., a sample/result rate of about 15 MHz), based on reference waveform 208 and at least one of local code waveform 212, a replica waveform 214, or a combined waveform 215. Thus, there will be approximately 15,000 correlation values for a period of 1023 chips which may be accumulated to provide a correlation result 240. For example, such a correlation result may have an integer value between 0 and about 15,000.

With collecting process 230, a plurality of correlation results for a correlation period (e.g., 20 msec interval) may then be summed together and the sum squared to establish a measurement value (e.g., an energy sum). For example, such a measurement value may have a positive integer value determined by squaring in integer between approximately −300, 000 and approximately +_300,000. A plurality of such measurement values may be collected (e.g., summed and the resulting sum squared) over a plurality of correlation periods (e.g., for one or more seconds with 50 correlation periods per each second) to establish a collected measurement value 224.

With combining process 232, a selected plurality of collected measurement values 224 may be arithmetically or otherwise combined using at least one formula to establish at least one combined measurement value 242.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

For example, one skilled in the art should now recognize that, in certain example implementations tracking processes/operations with the combined non-uniform result may not be necessary, as one may provide other functionality (e.g., a regular channel) that performs tracking in parallel. Thus, a non-uniform result may be implemented to provide a potentially multipath free measurement to "correct" the regular channel. Here, for example, such techniques may reduce energy usage by omitting such second channel.

Therefore, it is intended that claimed subject matter not be limited to the particular examples disclosed, but that such claimed subject matter may also include all aspects falling within the scope of appended claims, and equivalents thereof.

What is claimed is:

1. A method implemented in a mobile device comprising:
   accessing a plurality of collected measurement values stored in memory, each of said plurality of collected measurement values being associated with at least one result from correlation of a different waveform selected from a corresponding plurality of waveforms with a reference waveform;
   establishing at least one combined measurement value based, at least in part, on at least two of said plurality of collected measurement values; and
   performing a tracking operation for the reference waveform based, at least in part, on the at least one combined measurement value, established from the at least two of the plurality of collected measurement values resulting from correlation of waveforms selected from the plurality of waveforms with the reference waveform, to identify at least one wireless signal within the reference waveform.

2. The method as recited in claim 1, further comprising establishing said at least one correlation result for at least one of said plurality of waveforms by correlating said at least one of said plurality of waveforms with said reference waveform.

3. The method as recited in claim 1, further comprising arithmetically establishing at least one of said plurality of collected measurement values based, at least in part, on one or more correlation results associated with at least one of said plurality of waveforms.

4. The method as recited in claim 3, wherein arithmetically establishing said at least one of said plurality of collected measurement values comprises:
   summing said correlation results to establish an intermediate summation value; and
   squaring said intermediate summation value to establish a collected measurement value.

5. The method as recited in claim 3, wherein arithmetically establishing said at least one of said plurality of collected measurement values comprises adding or subtracting at least a portion at least a first collected measurement value to or from at least a portion of a second collected measurement value.

6. The method as recited in claim 3, wherein establishing said at least one combined measurement value comprises:
   establishing an intermediate product value by multiplying said at least two of said plurality of collected measurement values;
   establishing an intermediate square root value by taking a square root of said intermediate product value; and
   at least one of:
   adding or subtracting at least a portion of said intermediate square root value to or from at least a portion of at least one collected measurement value, and/or
   adding or subtracting at least a portion of said intermediate square root value to or from at least a portion of at least one other intermediate square root value.

7. The method as recited in claim 1, wherein performing said tracking operation based, at least in part, on said at least one combined measurement value comprises:
   initiating an establishment of at least one other combined measurement value based, at least in part, on at least a subset of said plurality of collected measurement values; and
   performing a subsequent tracking operation based, at least in part, on said at least one other combined measurement value.

8. The method as recited in claim 1, further comprising:
   receiving said reference waveform; and
   generating at least a portion of said plurality of waveforms based, at least in part, on a local code waveform.

9. The method as recited in claim 1, wherein said plurality of waveforms comprises at least one of a local code waveform, a replica waveform, and/or a combined waveform.

10. The method as recited in claim 1, wherein said at least one wireless signals comprises a satellite positioning system (SPS) signal.

11. An apparatus comprising:
    memory adapted to store a plurality of collected measurement values, each of said plurality of collected measurement values being associated with at least one value indicative of correlation of a different waveform selected from a corresponding plurality of waveforms with a reference waveform; and
    at least one processing unit operatively coupled to said memory and adapted to establish at least one combined measurement value based, at least in part, on at least two of said plurality of collected measurement values, and perform a tracking operation for the reference waveform based, at least in part, on the at least one combined measurement value, established from the at least two of the plurality of collected measurement values from correlation of waveforms selected from the plurality of waveforms with the reference waveform, to identify at least one wireless signal within a reference waveform.

12. The apparatus as recited in claim 11, further comprising:
    correlation circuitry operatively coupled to at least one of said memory and/or processing unit and adapted to establish said at least one value indicative of correlation of at least one of said plurality of waveforms by correlating said at least one of said plurality of waveforms with said reference waveform.

13. The apparatus as recited in claim 11, wherein said at least one processing unit is further adapted to establish at least one of said plurality of collected measurement values based, at least in part, on one or more values indicative of correlation associated with at least one of said plurality of waveforms.

14. The apparatus as recited in claim 13, wherein said at least one processing unit is further adapted to:
    sum said values indicative of correlation to establish an intermediate summation value; and
    square said intermediate summation value to establish a collected measurement value.

15. The apparatus as recited in claim 13, wherein said at least one processing unit is further adapted to add or subtract at least a portion at least a first collected measurement value to or from at least a portion of a second collected measurement value.

16. The apparatus as recited in claim 13, wherein said at least one processing unit is further adapted to:
   establish an intermediate product value by multiplying said at least two of said plurality of collected measurement values;
   establish an intermediate square root value by taking a square root of said intermediate product value; and
   at least one of:
      add or subtract at least a portion of said intermediate square root value to or from at least a portion of at least one collected measurement value, and/or
      add or subtract at least a portion of said intermediate square root value to or from at least a portion of at least one other intermediate square root value.

17. The apparatus as recited in claim 11, wherein said at least one processing unit is further adapted to:
   initiate an establishment of at least one other combined measurement value based, at least in part, on at least a subset of said plurality of collected measurement values; and
   perform a subsequent tracking operation based, at least in part, on said at least one other combined measurement value.

18. The apparatus as recited in claim 11, further comprising receiver circuitry operatively coupled to at least one of said memory and/or said at least one processing unit and adapted to receive said reference waveform.

19. The apparatus as recited in claim 11, further comprising waveform generation circuitry operatively coupled to at least one of said memory and/or said at least one processing unit and adapted to generate said plurality of waveforms based, at least in part, on a local code waveform.

20. The apparatus as recited in claim 11, wherein said plurality of waveforms comprises at least one of a local code waveform, a replica waveform, and/or a combined waveform.

21. The apparatus as recited in claim 11, wherein said at least one wireless signals comprises a satellite positioning system (SPS) signal.

22. An apparatus comprising:
   means for establishing a plurality of collected measurement values, each of said plurality of collected measurement values being associated with at least one value indicative of correlation of a different waveform selected from a corresponding plurality of waveforms;
   means for establishing at least one combined measurement value based, at least in part, on at least two of said plurality of collected measurement values; and
   means for performing a tracking operation for the reference waveform based, at least in part, on the at least one combined measurement value, established from the at least two of the plurality of collected measurement values indicative of correlation of waveforms selected from the plurality of waveforms with the reference waveform, to identify at least one wireless signal within a reference waveform.

23. The apparatus as recited in claim 22, further comprising:
   means for establishing said at least one value indicative of correlation of at least one of said plurality of waveforms by correlating said at least one of said plurality of waveforms with said reference waveform.

24. The apparatus as recited in claim 22, further comprising:
   means for establishing at least one of said plurality of collected measurement values based, at least in part, on one or more values indicative of correlation associated with at least one of said plurality of waveforms.

25. The apparatus as recited in claim 22, further comprising:
   means for initiating an establishment of at least one other combined measurement value based, at least in part, on at least a subset of said plurality of collected measurement values.

26. The apparatus as recited in claim 22, further comprising means for receiving said reference waveform.

27. The apparatus as recited in claim 22, further comprising means for generating said plurality of waveforms based, at least in part, on a local code waveform.

28. The apparatus as recited in claim 22, wherein said plurality of waveforms comprises at least one of a local code waveform, a replica waveform, and/or a combined waveform.

29. The apparatus as recited in claim 22, wherein said at least one wireless signals comprises a satellite positioning system (SPS) signal.

30. A non-transitory computer readable medium comprising computer implementable instructions stored thereon which if executed by at least one processing unit adapt said at least one processing unit to:
   access a plurality of collected measurement values, each of said plurality of collected measurement values being associated with at least one result from correlation of a different waveform selected from a corresponding plurality of waveforms;
   establish at least one combined measurement value based, at least in part, on at least two of said plurality of collected measurement values; and
   perform a tracking operation for the reference waveform based, at least in part, on the at least one combined measurement value, established from the at least two of the plurality of collected measurement values resulting from correlation of waveforms selected from the plurality of waveforms with the reference waveform, to identify at least one wireless signal within a reference waveform.

31. The computer readable medium as recited in claim 30, comprising further computer implementable instructions, which if executed by at least one processing unit adapt said at least one processing unit to establish at least one of said plurality of collected measurement values based, at least in part, on one or more correlation results associated with at least one of said plurality of waveforms.

32. The computer readable medium as recited in claim 31, comprising further computer implementable instructions, which if executed by at least one processing unit adapt said at least one processing unit to:
   sum said correlation results to establish an intermediate summation value; and
   square said intermediate summation value to establish a collected measurement value.

33. The computer readable medium as recited in claim 31, comprising further computer implementable instructions, which if executed by at least one processing unit adapt said at least one processing unit to add or subtract at least a portion at least a first collected measurement value to or from at least a portion of a second collected measurement value.

34. The computer readable medium as recited in claim 31, comprising further computer implementable instructions, which if executed by at least one processing unit adapt said at least one processing unit to:
- establish an intermediate product value by multiplying said at least two of said plurality of collected measurement values;
- establish an intermediate square root value by taking a square root of said intermediate product value; and
- at least one of:
  - add or subtract at least a portion of said intermediate square root value to or from at least a portion of at least one collected measurement value, and/or
  - add or subtract at least a portion of said intermediate square root value to or from at least a portion of at least one other intermediate square root value.

35. The computer readable medium as recited in claim 30, comprising further computer implementable instructions, which if executed by at least one processing unit adapt said at least one processing unit to:
- initiate an establishment of at least one other combined measurement value based, at least in part, on at least a subset of said plurality of collected measurement values; and
- perform a subsequent tracking operation based, at least in part, on said at least one other combined measurement value.

36. The computer readable medium as recited in claim 30, wherein said plurality of waveforms comprises at least one of a local code waveform, a replica waveform, and/or a combined waveform.

37. The computer readable medium as recited in claim 30, wherein said at least one wireless signals comprises a satellite positioning system (SPS) signal.

* * * * *